US006563552B1

United States Patent
Chujo

(10) Patent No.: US 6,563,552 B1
(45) Date of Patent: May 13, 2003

(54) IMAGE CORRECTING METHOD AND DEVICE AND CATHODE RAY TUBE DISPLAY UNIT

(75) Inventor: Takeshi Chujo, Tokyo (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 09/428,333

(22) Filed: Oct. 27, 1999

(30) Foreign Application Priority Data

Apr. 6, 1999 (JP) .......................................... 11-098663

(51) Int. Cl.$^7$ ............................. H04N 5/68; H04N 9/16; H04N 9/28; H04N 3/22; H04N 3/26; H01J 29/56; H01J 29/70; H01J 29/76; G09G 1/04

(52) U.S. Cl. ..................... 348/807; 348/805; 348/806; 348/380; 315/370; 315/401

(58) Field of Search ................................. 348/807, 805, 348/806, 173, 377–380, 745–747; 315/1, 8, 370, 380, 381, 401, 411, 383; H04N 9/28

(56) References Cited

U.S. PATENT DOCUMENTS

| | | | | |
|---|---|---|---|---|
| 4,206,388 A | * | 6/1980 | Ishigaki et al. | 315/371 |
| 5,034,667 A | * | 7/1991 | Lendaro | 315/411 |
| 5,559,565 A | * | 9/1996 | Yun | 348/806 |
| 5,583,401 A | * | 12/1996 | Inoue et al. | 315/370 |
| 5,627,605 A | * | 5/1997 | Kim | 348/745 |
| 5,998,943 A | * | 12/1999 | Tanizoe | 315/370 |
| 6,020,694 A | * | 2/2000 | Shim | 315/387 |
| 6,040,664 A | * | 3/2000 | Dieterle et al. | 315/383 |
| 6,072,547 A | * | 6/2000 | Sluyterman | 348/807 |
| 6,091,212 A | * | 7/2000 | Park | 315/370 |
| 6,128,048 A | * | 10/2000 | Cho | 348/745 |
| 6,148,112 A | * | 11/2000 | Chujo | 382/254 |
| 6,274,990 B1 | * | 8/2001 | Hojo et al. | 315/401 |
| 6,326,743 B1 | * | 12/2001 | Kikuchi et al. | 315/370 |

FOREIGN PATENT DOCUMENTS

| | | |
|---|---|---|
| GB | 1249798 | 10/1971 |
| GB | 1 506 749 | 4/1978 |
| JP | A 7107501 | 4/1995 |
| JP | 10-164612 A | 6/1996 |
| JP | A 10164609 | 6/1998 |
| JP | 10-243411 | 9/1998 |

* cited by examiner

Primary Examiner—John Miller
Assistant Examiner—Paulos Natnael
(74) Attorney, Agent, or Firm—Birch, Stewart, Kolasch & Birch, LLP

(57) ABSTRACT

Provided are an image correcting method and device capable of reducing power consumption necessary for correcting an image for a long-time use and a cathode ray tube display unit. A microcomputer 2 calculates a value of a correction current in such a manner that the correction current is more decreased monotonously as a time passes after a cathode ray tube is turned on. Drivers 3 to 7 and 22 generate and output the correction current according to the value of the correction current calculated by the microcomputer 2. A correcting device C is provided in the cathode ray tube and serves to correct an image displayed on the cathode ray tube on receipt of the correction currents from the drivers 3 to 7 and 22.

11 Claims, 16 Drawing Sheets

LANDING DISPLACEMENT: MAXIMUM    LANDING DISPLACEMENT: MINIMUM

CONVERGENCE DISPLACEMENT: MAXIMUM    CONVERGENCE DISPLACEMENT: MINIMUM

C { 
8 : FIRST LANDING CORRECTING COIL
9 : SECOND LANDING CORRECTING COIL
10 : THIRD LANDING CORRECTING COIL
11 : FOURTH LANDING CORRECTING COIL
12 : CONVERGENCE CORRECTING COIL
23 : DEFLECTING YOKE

LANDING DISPLACEMENT : 10um

LANDING DISPLACEMENT : 0um

LANDING DISPLACEMENT: MINIMUM

LANDING DISPLACEMENT: MAXIMUM

CONVERGENCE DISPLACEMENT: MINIMUM

CONVERGENCE DISPLACEMENT: MAXIMUM

IMAGE CORRECTING METHOD AND DEVICE AND CATHODE RAY TUBE DISPLAY UNIT

BACKGROUND OF THE INVENTION

1. Field of the Invention

The present invention relates to an image correcting method and device for correcting an image displayed on a cathode ray tube (CRT), for example, and a cathode ray tube display unit to which they are applied.

2. Description of the Background Art

FIG. 24 is a block diagram showing an image correcting device according to the prior art. The image correcting device shown in FIG. 24 comprises a CR timer 1, a microcomputer 2a, drivers 3 to 7, first to fourth coils 8 to 11 for correcting landing (which will be hereinafter referred to as landing correcting coils), and a coil 12 for correcting convergence (which will be hereinafter referred to as a convergence correcting coil). The first to fourth landing correcting coils 8 to 11 and the convergence correcting coil 12 are fixed to a cathode ray tube (not shown).

When the cathode ray tube is turned on (the time that the cathode ray tube is turned on will be hereinafter referred to as "power ON"), a deterioration in the landing and convergence of the cathode ray tube starts to be caused. When the cathode ray tube is turned off (the time that the cathode ray tube is turned off will be hereinafter referred to as "power OFF"), the deterioration starts to be recovered. The CR timer 1 always operates also when the cathode ray tube is turned on and off. The CR timer 1 outputs a deterioration detecting signal TS according to the degree of the deterioration in the landing and the convergence.

The microcomputer 2a calculates an optimum correction current value from the deterioration detecting signal TS when a time passes after the power ON. The drivers 3 to 7 cause a correction current having the value calculated by the microcomputer 2a to flow to the first to fourth landing correcting coils 8 to 11 and the convergence correcting coil 12. The first to fourth landing correcting coils 8 to 11 and the convergence correcting coil 12 properly regulate the landing and the convergence according to the correction current.

As described above, the image correcting device automatically corrects the landing and convergence of an image displayed on the cathode ray tube by supplying the correction current to the cathode ray tube.

FIGS. 25 and 26 show a state obtained immediately after the power ON and conventional changes in the landing and the convergence to a state obtained after the time fully passes (for example, three hours) since the state obtained immediately after the power ON. As shown in FIGS. 25 and 26, the landing and the convergence are not deteriorated immediately after the power ON. Therefore, an image is displayed in a desired position (that is, a displacement from the desired position of the image is a minimum (zero)). Thus, a state in which the image is displayed in the desired position will be referred to as a "just state". The states of the landing and the convergence which are obtained at that time will be referred to as "just landing" and "just convergence", respectively.

As the time passes after the power ON, the landing and the convergence are deteriorated and the image is shifted from the desired position and is displayed. When the time fully passes (for example, three hours) after the power ON, the deteriorations in the landing and the convergence are brought into a saturation state and the displacement from the desired position of the image becomes a maximum.

As shown in FIG. 25, for example, as the time passes after the power ON, an upper left portion of the image is shifted from the left to the right (in a direction F) from the desired position. In this case, if a proper correction current is caused to flow to the landing correcting coil provided for correction on the upper left portion of the image to move the upper left portion of the image in a direction reverse to the direction F, the just state can be obtained, that is, the image can be displayed in the desired position.

FIG. 27 shows a conventional relationship between a time (an elapsed time) which has passed after the power ON and a correction current and a displacement from a desired position of an image. As shown in FIG. 27, conventionally, the correction current has been increased with the passage of the time in order to keep the just state all the time.

However, after the time fully passes after the power ON, the correction current always flows at a maximum value. Accordingly, there has been a problem in that power is largely consumed when the cathode ray tube is to be used for a long time.

In order to solve the above-mentioned problem, it is an object of the present invention to provide an image correcting method and device capable of reducing power consumption required for correcting an image for a long-time use, and a cathode ray tube display unit.

SUMMARY OF THE INVENTION

A first aspect of the present invention is directed to a method for automatically correcting an image displayed on a cathode ray tube by supplying a correction current to the cathode ray tube, comprising the step of monotonously decreasing the correction current more as a time passes after the cathode ray tube is turned on.

A second aspect of the present invention is directed to the image correcting method, further comprising the step of reducing a rate of the decrease in the correction current more as a time passes after the cathode ray tube is turned on.

A third aspect of the present invention is directed to the image correcting method, further comprising the step of causing the correction current to approximate to zero after the cathode ray tube is turned on.

A fourth aspect of the present invention is directed to the image correcting method, wherein an object for automatically correcting the image includes at least one of landing, convergence and a horizontal image position.

A fifth aspect of the present invention is directed to an image correcting device for automatically correcting an image displayed on a cathode ray tube by supplying a correction current to the cathode ray tube, comprising a calculating circuit for calculating a value of the correction current in such a manner that the correction current is more decreased monotonously as a time passes after the cathode ray tube is turned on, a driver for generating and outputting the correction current in accordance with a result of the calculation obtained by the calculating circuit, and a correcting device provided in the cathode ray tube for correcting the image displayed on the cathode ray tube on receipt of the correction current from the driver.

A sixth aspect of the present invention is directed to the image correcting device, wherein the calculating circuit calculates the value of the correction current in such a manner that a rate of the decrease in the correction current is more reduced as a time passes after the cathode ray tube is turned on.

A seventh aspect of the present invention is directed to the image correcting device, wherein the calculating circuit calculates the value of the correction current in such a manner that the correction current is caused to approximate to zero after the cathode ray tube is turned on.

An eighth aspect of the present invention is directed to the image correcting device, wherein the correcting device includes at least one of a coil for correcting landing, a coil for correcting convergence and a yoke for correcting a horizontal image position.

A ninth aspect of the present invention is directed to the image correcting device, further comprising an external terminal for giving data necessary for the calculating circuit to calculate the value of the correction current from an outside.

A tenth aspect of the present invention is directed to a cathode ray tube display unit comprising the image correcting device according to any of the fifth to ninth aspects of the present invention, and the cathode ray tube.

According to the first aspect of the present invention, the correction current is more decreased as the time passes. Consequently, the power consumption necessary for correcting the image can be more reduced as the time passes. Therefore, the power consumption can be reduced for a long-time use.

According to the second aspect of the present invention, the characteristics of the cathode ray tube cause the rate of the increase in the deterioration to be more reduced as the time passes after the cathode ray tube is turned on. Correspondingly, the rate of the decrease in the correction current is more reduced as the time passes. Consequently, the image of the cathode ray tube can properly be corrected.

According to the third aspect of the present invention, the correction current becomes zero if the time fully passes after the power is turned on. Therefore, it is possible to cause the power consumption necessary for correcting the image to become zero.

According to the fourth aspect of the present invention, it is possible to reduce the power consumption necessary for correcting the landing, the convergence or the horizontal image position.

According to the fifth aspect of the present invention, the driver further reduces the correction current as the time passes. Consequently, the power consumption of the correcting device can be more reduced as the time passes. Therefore, it is possible to reduce the power consumption for a long-time use.

According to the sixth aspect of the present invention, the characteristics of the cathode ray tube cause the rate of the increase in the deterioration to be more reduced as the time passes after the cathode ray tube is turned on. Correspondingly, the rate of the decrease in the correction current output from the driver is more reduced as the time passes. Consequently, the image of the cathode ray tube can properly be corrected.

According to the seventh aspect of the present invention, the correction current output from the driver becomes zero if the time fully passes after the power is turned on. Therefore, it is possible to cause the power consumption necessary for correcting the image to become zero.

According to the eighth aspect of the present invention, it is possible to reduce the power consumption of the coil for correcting landing, the coil for correcting convergence or the yoke for correcting a horizontal image position.

According to the ninth aspect of the present invention, the data corresponding to the cathode ray tube is given to the external terminal. Consequently, it is possible to perform optimal correction on the cathode ray tube.

According to the tenth aspect of the present invention, the power consumption of the cathode ray tube display unit can be reduced for a long-time use.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 25:
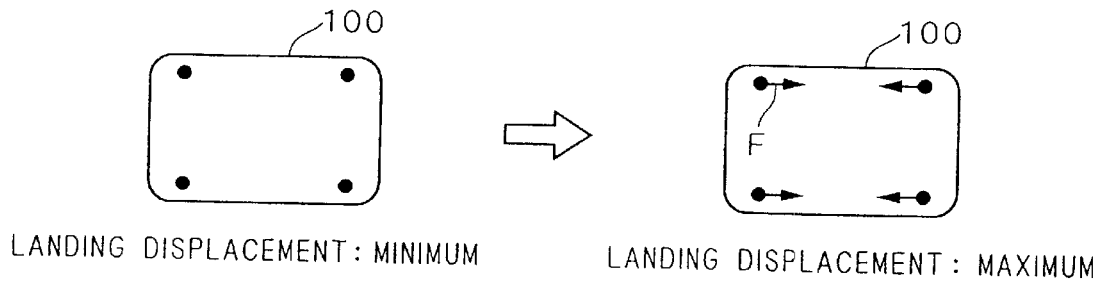
FIGS. 25 to 27 are diagrams illustrating operation of the image correcting device according to the prior art.
Figure 26:
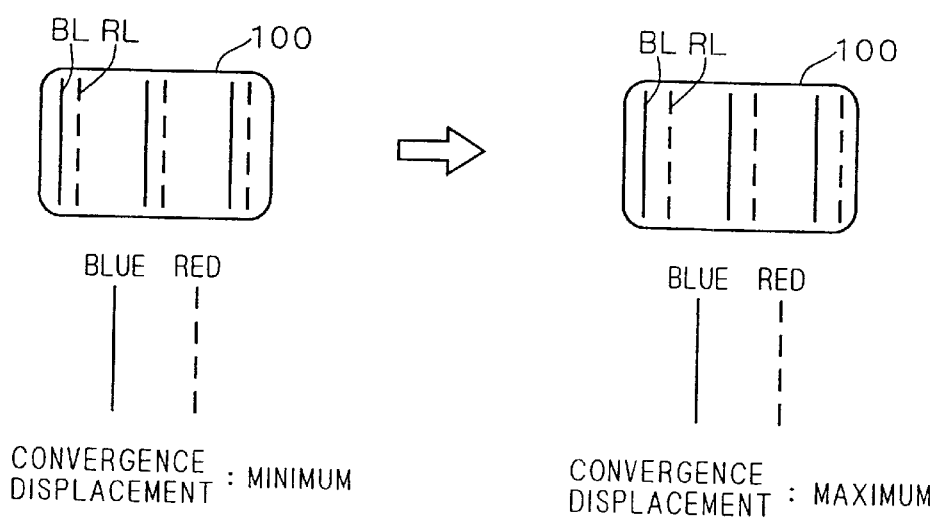
Figure 27:
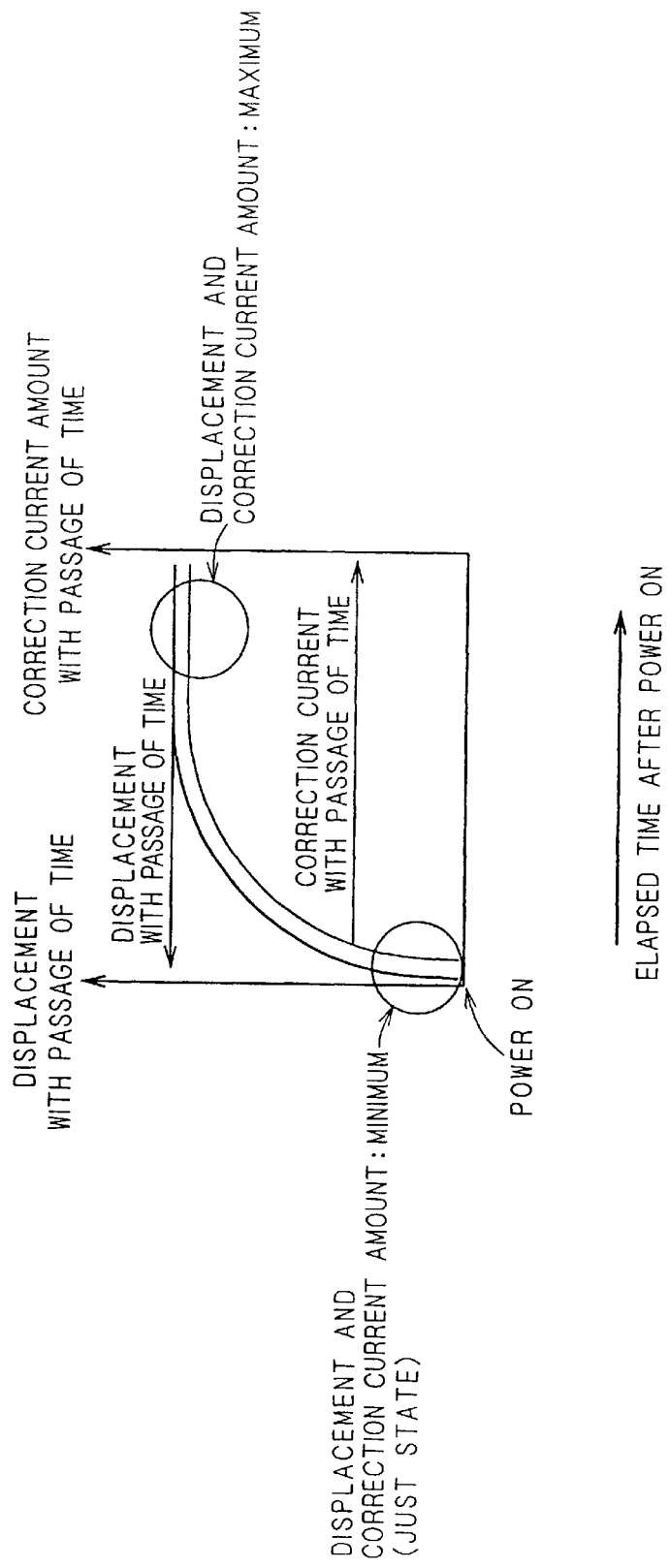

A cathode ray tube according to the prior art has had features shown in FIGS. 25 and 26. In a conventional way, a just state is obtained, that is, an image is displayed in a desired position immediately after power ON. As a time passes after the power ON, landing and convergence are deteriorated so that the image is shifted from the desired position and is displayed. When the time fully passes (for example, three hours) after the power ON, the deteriorations in the landing and the convergence are brought into a saturation state and a displacement from the desired position of the image becomes a maximum.

Figure 1:
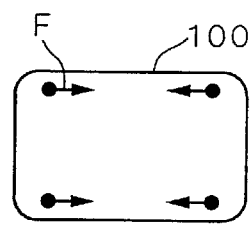
FIGS. 1 to 3 are diagrams illustrating operation of an image correcting device according to the present invention.
Figure 1:
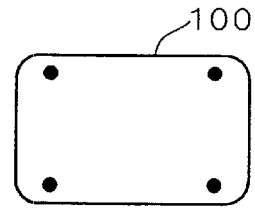
Figure 2:
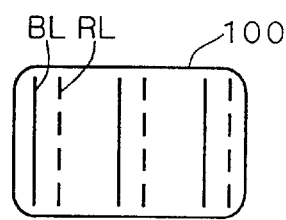
Figure 2:
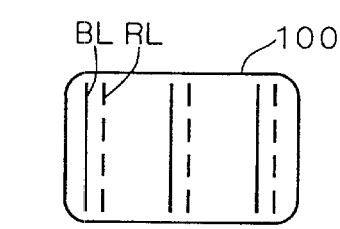

On the other hand, a cathode ray tube having features shown in FIGS. 1 and 2 is used in the present invention. More specifically, the present invention is reverse to the prior art in that an image is shifted from a desired position and is displayed immediately after the power ON. When a time passes after the power ON, alignment such as landing, convergence or the like is deteriorated. However, effects can be obtained in that the image approaches the desired position. When the time fully passes (for example, three hours) after the power ON, the deterioration in the alignment is brought into a saturation state. At that time, a just state is obtained, that is, the image is displayed in the desired position.

The above-mentioned cathode ray tube according to the prior art and the cathode ray tube to be applied to the present invention essentially have different relative positional relationships between a display surface 100 on which the image of the cathode ray tube is to be displayed and the desired position, respectively. Therefore, the cathode ray tube to be use d in the present invention can be obtained by using the prior art.

Figure 3:
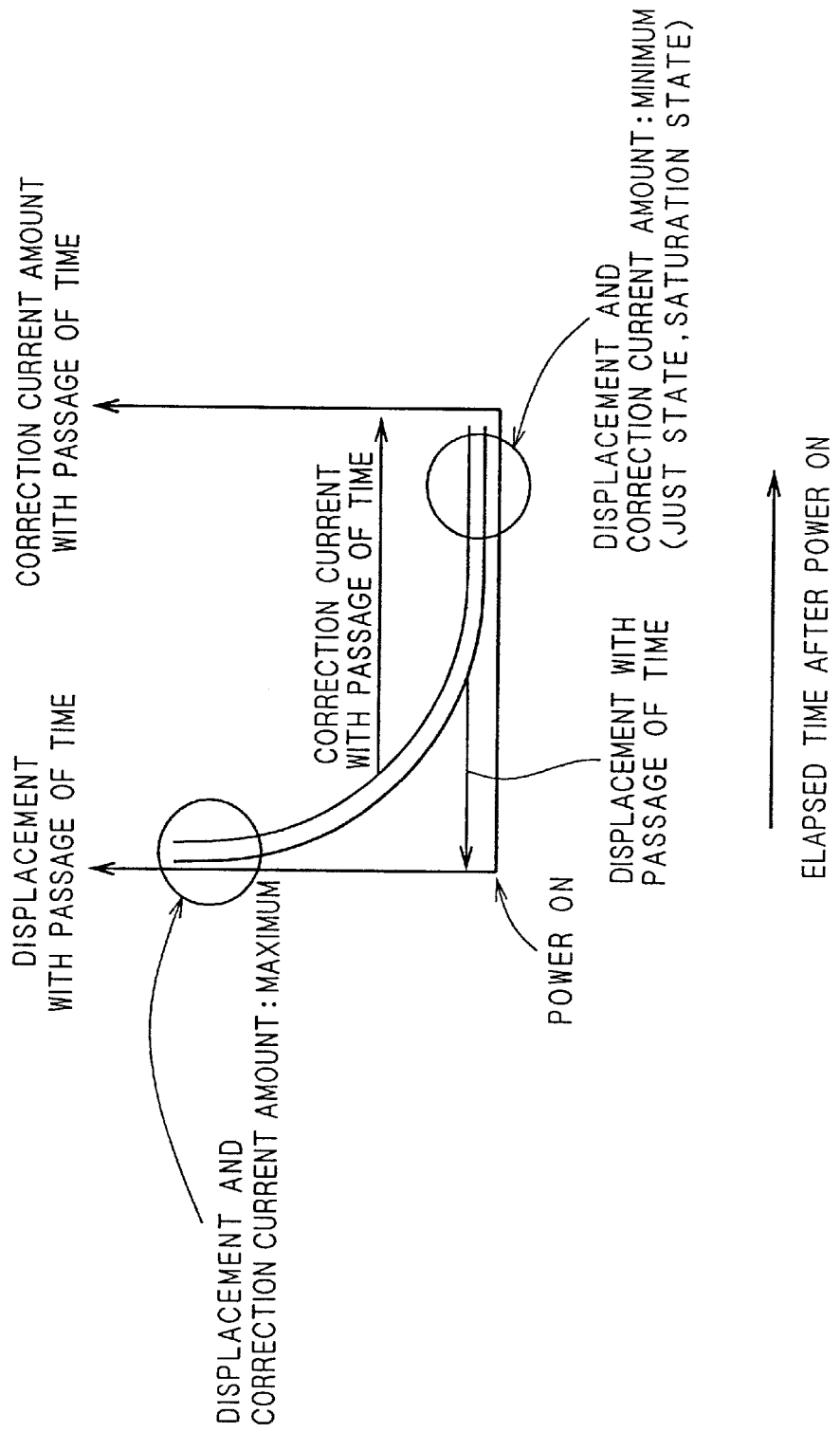

FIG. 3 shows the relationship between a time (an elapsed time) which has passed after the power ON and a correction current and a displacement from the desired position of the image according to the present invention. In the present invention, for example, an upper left portion of the image is not set in the desired position immediately after the power ON as shown in FIG. 1. Therefore, a proper correction current is caused to flow to a landing correcting coil provided for correcting the upper left portion of the image. Consequently, the upper left portion of the image is moved in a direction reverse to a direction F, thereby obtaining a just state, that is, displaying the image in the desired position. As the time passes after the power ON, the landing is more deteriorated so that the upper left portion of the image is apt to be shifted from the left to the right (the direction F). If the upper left portion of the image is moved and returned in the direction reverse to the direction F by decreasing the correction current, the just state can be kept even if the time passes after the power ON. As compared with the prior art in which the correction current is increased with the passage of a time after the power ON, accordingly, power consumption required for correcting the image can be more reduced as the time fully passes after the power ON.

In the condition of the use in which cathode ray tubes are kept on for hours in a plurality of cathode ray tube display units (for example, a display of a computer, a television receiver and the like which include a cathode ray tube), particularly, the effect of reducing the power consumption according to the present invention can be obtained remarkably.

An embodiment of the present invention will be described below more specifically.

Figure 4:
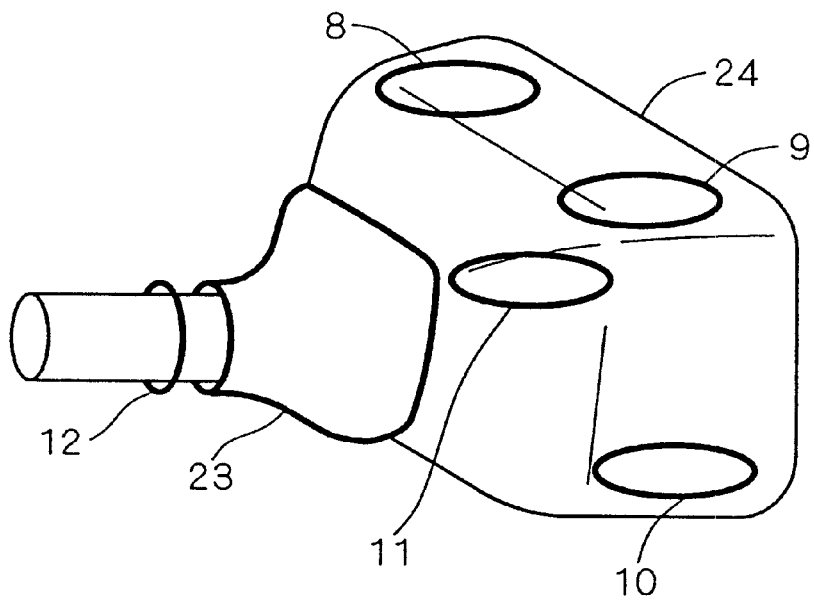
FIG. 4 is a perspective view typically showing a correcting device according to an embodiment of the present invention.

FIG. 4 is a perspective view typically illustrating a correcting device C for correcting an image displayed on a display surface 100 of a cathode ray tube 24. The correcting device C is fixed to the cathode ray tube 24, and comprises first to fourth landing correcting coils 8 to 11, a convergence correcting coil 12 and a yoke (hereinafter referred to as a deflecting yoke) 23 for correcting a horizontal image position in FIG. 4. The convergence correcting coil 12 is fixed to a neck portion of the cathode ray tube 24, the deflecting yoke 23 is fixed to a base of the neck portion, and the first to fourth landing correcting coils 8 to 11 are fixed to four corners of the display surface 100.

Figure 5:
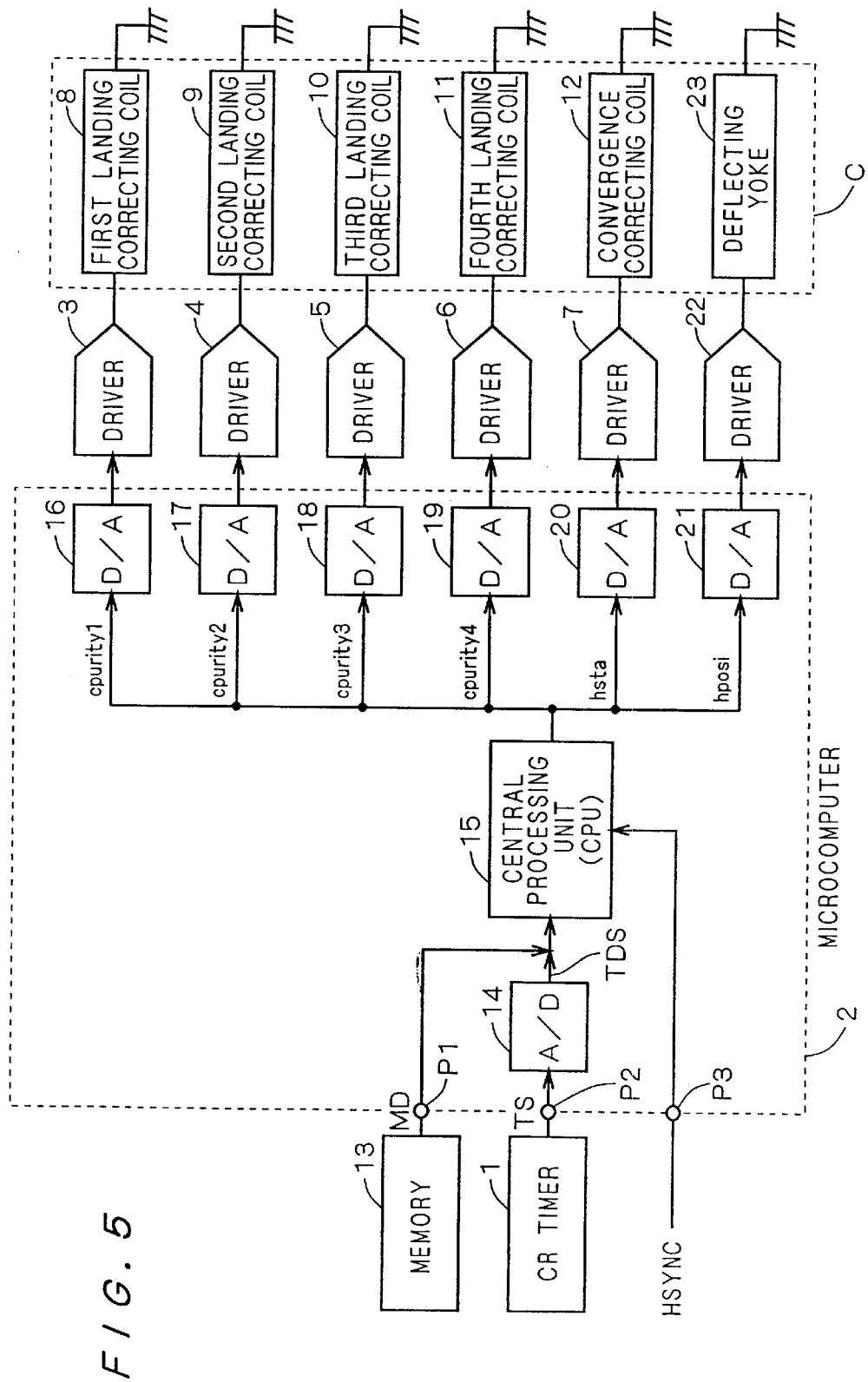
FIG. 5 is a block diagram showing an image correcting device according to the embodiment of the present invention.

FIG. 5 is a block diagram showing a structure of an image correcting device according to the embodiment of the present invention. The image correcting device shown in FIG. 5 comprises a CR timer 1, a memory 13, a microcomputer 2 (calculating circuit), drivers 3 to 7 and 22, first to fourth landing correcting coils 8 to 11, a convergence correcting coil 12 and a deflecting yoke 23. The microcomputer 2 includes an A/D converter 14, a central processing unit (hereinafter referred to as a CPU) 15, D/A converters 16 to 21, and external terminals P1 to P3.

Figure 21:
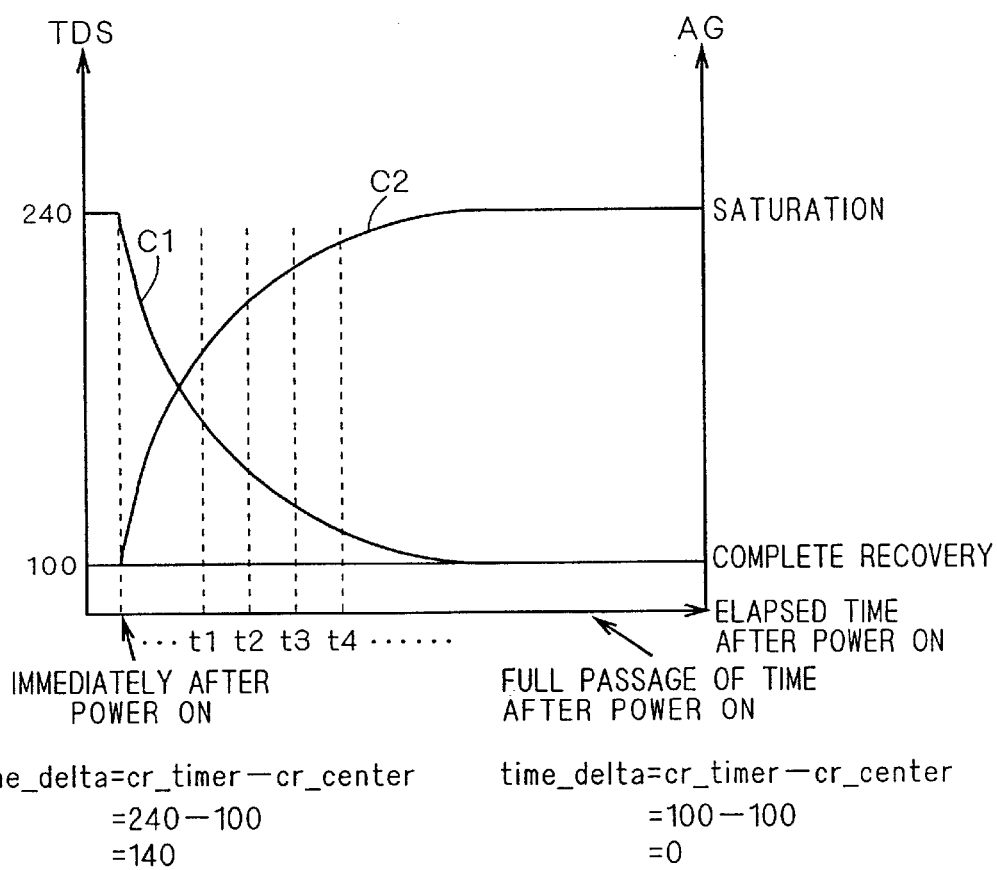

The CR timer 1 is designed corresponding to a deterioration in alignment (comprising landing, convergence and a horizontal image position) of the cathode ray tube 24. More specifically, the cathode ray tube 24 is characterized in that the deterioration in the alignment starts to be caused when a power is turned on and the deterioration stars to be recovered when the power is turned off. A characteristic curve C2 of FIG. 21 shows a relationship between an elapsed time and a degree AG of the deterioration in the alignment. The degree AG of the deterioration is specifically equivalent to a displacement from a desired position of an image. In the cathode ray tube 24 to be applied to the present invention, as the degree AG of the deterioration is increased, the image further approaches the desired position. FIG. 21 shows the case where the cathode ray tube 24 is turned on in a state in which the deterioration in the alignment is completely recovered.

On the other hand, a deterioration value TDS of a deterioration detecting signal TS of the CR timer 1 is characterized in that it is changed corresponding to the degree AG of the deterioration, it starts to be decreased when the cathode ray tube 24 is turned on, and it starts to be increased when the cathode ray tube 24 is turned off. The degree AG of the deterioration is almost exponential. In other words, the rate of a change in the degree AG to a time is more reduced as the time passes after power ON. Correspondingly, the deterioration value TDS of the deterioration detecting signal TS is also changed exponentially. Thus, it is possible to design the CR timer 1 such that the deterioration value TDS is exponentially generated by utilizing an integrating circuit comprising a capacitor and a resistor as is well known, for example.

As described above, the CR timer 1 is designed to cope with the deterioration in the alignment, always operates when the cathode ray tube 24 is kept on and off, and outputs the deterioration detecting signal TS corresponding to the degree AG of the deterioration in the alignment of the cathode ray tube 24.

The memory 13 shown in FIG. 5 is a ROM (Read Only Memory) or the like, for example, and prestores data MD necessary for the microcomputer 2 to calculate a proper correction current value corresponding to the deterioration in the alignment of the cathode ray tube 24.

The data MD stored in the memory 13 is given to the external terminal P1, the deterioration detecting signal TS output from the CR timer 1 is sent to the external terminal P2, and other necessary signals (for example, a horizontal deflecting signal HSYNC) are sent to the external terminal P3.

In the microcomputer 2, the A/D converter 14 converts the deterioration detecting signal TS into a deterioration value TDS ranging from 0 to 255, for example. The CPU 15 receives the data MD, the deterioration value TDS, the horizontal deflecting signal HSYNC and the like, and calculates current values cpurity1, cpurity2, cpurity3, cpurity4, hsta and hposi (ranging from 0 to 255, for example) of a correction current to be supplied to the first to fourth landing correcting coils 8 to 11, the convergence correcting coil 12 and the deflecting yoke 23. The D/A converters 16 to 21 convert the current values cpurity1, cpurity2, cpurity3, cpurity4, hsta and hposi into analog signals, respectively.

The drivers 3 to 7 and 22 generate and output correction currents having current values indicated by the analog signals sent from the D/A converters 16 to 21, and cause the correction currents to flow to the first to fourth landing correcting coils 8 to 11, the convergence correcting coil 12 and the deflecting yoke 23, respectively. The first to fourth landing correcting coils 8 to 11, the convergence correcting coil 12 and the deflecting yoke 23 properly regulate landing and convergence according to the correction currents.

As described above, the image correcting device according to the embodiment of the present invention supplies the correction current to the cathode ray tube 24, thereby automatically correcting alignment of an image displayed on the cathode ray tube 24.

Figure 6:
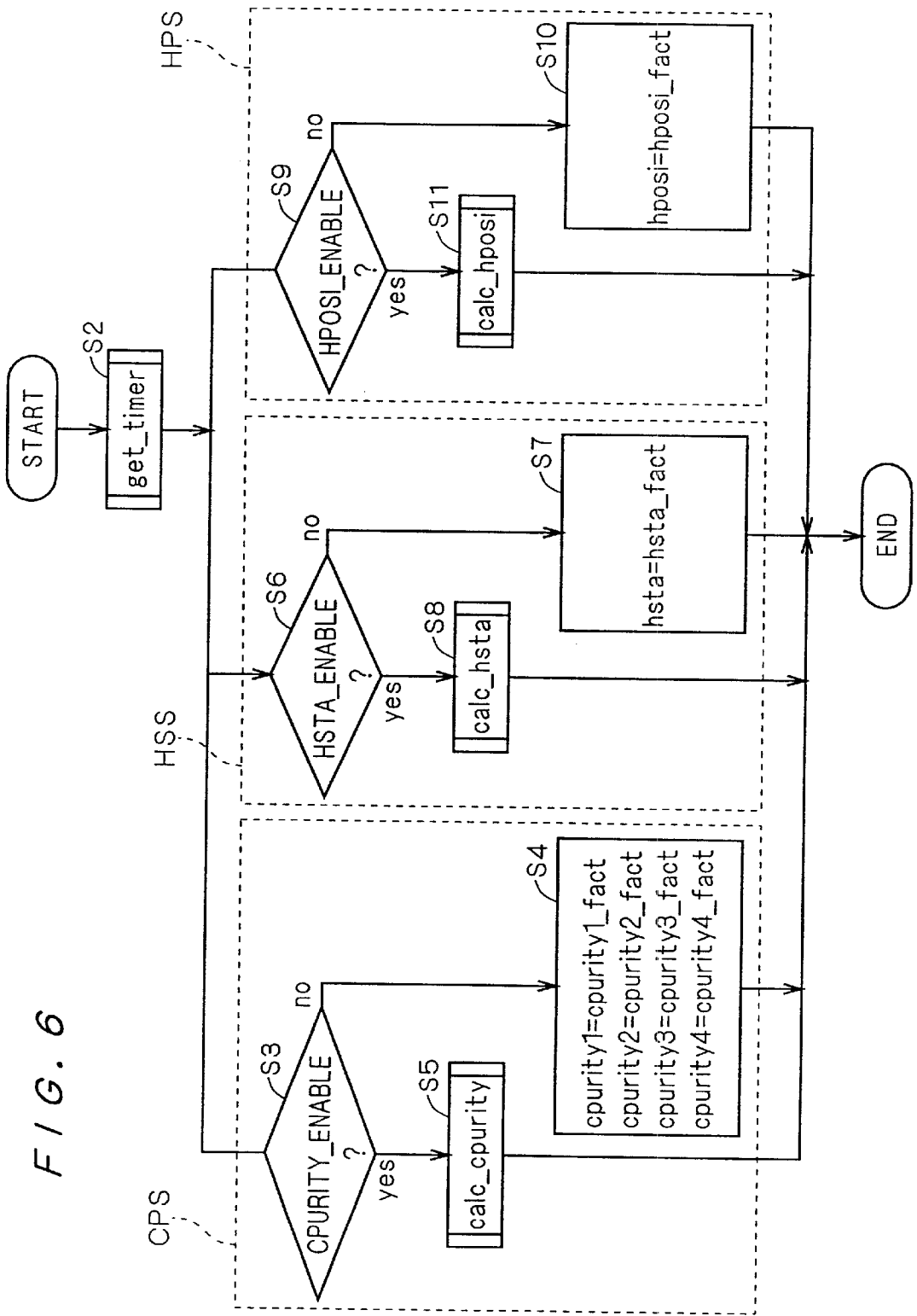
FIGS. 6 to 11 are flowcharts showing an image correcting method according to an embodiment of the present invention.

Next, description will be given to a software (computer program) to be executed by the CPU 15 to calculate the current values cpurity1, cpurity2, cpurity3, cpurity4, hsta and hposi (ranging from 0 to 255, for example). FIG. 6 is a flowchart showing a main routine for calculating the correction current of the computer program.

When a main routine is executed (starts), first of all, a get_timer subroutine S2 is executed in which a deterioration value cr_steady obtained by filtering a deterioration value TDS at the present time is calculated. Next, a landing correcting step CPS for correcting landing, a convergence correcting step HSS for correcting convergence and a horizontal image position correcting step HPS for correcting a horizontal image position are executed based on the deterioration value cr_steady. Then, the main routine ends. The above-mentioned main routine is cyclically executed repeatedly from the power ON to the power OFF, . . . , times t1, t2, t3, t4, . . . , as shown in FIG. 21.

The landing correcting step CPS includes a CPURITY_ENABLE step S3, a step S4 and a calc_cpurity subroutine S5. At the CPURITY_ENABLE step S3, the deterioration value cr_steady is compared with an expected value cr_center (an expected value of the deterioration value cr_steady with the deterioration in the alignment set in a saturation state, for example, 100 in FIG. 21). If the deterioration value cr_steady is greater than the expected value cr_center (yes), it is decided that landing correction is executed because the saturation state is not set. If the deterioration value cr_steady is not greater than the expected value cr_center (no), it is decided that the landing correction is not executed because the saturation state is set. If the correction is not executed (no), the current values cpurity1, cpurity2, cpurity3 and cpurity4 which are input to the D/A converters 16 to 19 are set to non-correction values cpurity1_fact, cpurity2_fact, cpurity3_fact and cpurity4_fact for executing no correction, respectively (step S4). If the correction is executed (yes), each of the current values cpurity1, cpurity2, cpurity3 and cpurity4 is set smaller than a value at a last time t3 (the calc_cpurity subroutine S5).

The convergence correcting step HSS includes a HSTA_ENABLE step S6, a step S7 and a calc_hsta subroutine S8. At the HSTA_ENABLE step S6, the deterioration value cr_steady is compared with the expected value cr_center. If the deterioration value cr_steady is greater than the expected value cr_center (yes), it is decided that convergence correction is executed because the saturation state is not set. If the deterioration value cr_steady is not greater than the expected value cr_center (no), it is decided that the convergence correction is not executed because the saturation state is set. If the correction is not executed (no), a current value hsta which is input to the D/A converter 20 is set to a non-correction value hsta_fact for executing no correction (step S7). If the correction is executed (yes), the current value hsta is set smaller than a value at the last time t3 (the calc_hsta subroutine S8).

The horizontal image position correcting step HPS includes a HPOSI_ENABLE step S9, a step S10 and a calc_hposi subroutine S11. At the HPOSI_ENABLE step S9, the deterioration value cr_steady is compared with the expected value cr_center. If the deterioration value cr_steady is greater than the expected value cr_center (yes), it is decided that horizontal image position correction is executed because the saturation state is not set. If the deterioration value cr_steady is not greater than the expected value cr_center (no), it is decided that the horizontal image position correction is not executed because the saturation state is set. If the correction is not executed (no), a current value hposi which is input to the D/A converter 21 is set to a non-correction value hposi_fact for executing no correction (step S10). If the correction is executed (yes), the current value hposi is set smaller than a value at the last time t3. (the calc_hposi subroutine S11).

Figure 7:
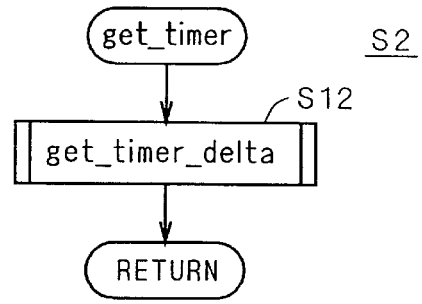

FIG. 7 shows a get_timer subroutine S2. The get_timer subroutine S2 includes a get_timer_delta subroutine S12. The get timer_delta subroutine S12 is a dependent module which is common to the calc_cpurity subroutine S5, the calc_hsta subroutine S8 and the calc_hposi subroutine S11, and is intended to calculate a saturation arrival time time_delta at a present time t4 which is required at the calc_cpurity subroutine S5, the calc_hsta subroutine S8 and the calc_hposi subroutine S11 (a period from the present time t4 to a saturation of the deterioration in the alignment). Since the function of fetching the deterioration value cr_steady which is an original object of the get_timer subroutine S2 is closely related to the calculation of the saturation arrival time time_delta, it is included in the dependent module. When the get_timer subroutine S2 starts, the get_timer_delta subroutine S12 is executed to calculate the deterioration value cr_steady and the saturation arrival time time_delta at the present time t4. When the get_timer_delta subroutine S12 ends, the process returns to the main routine.

Figure 8:
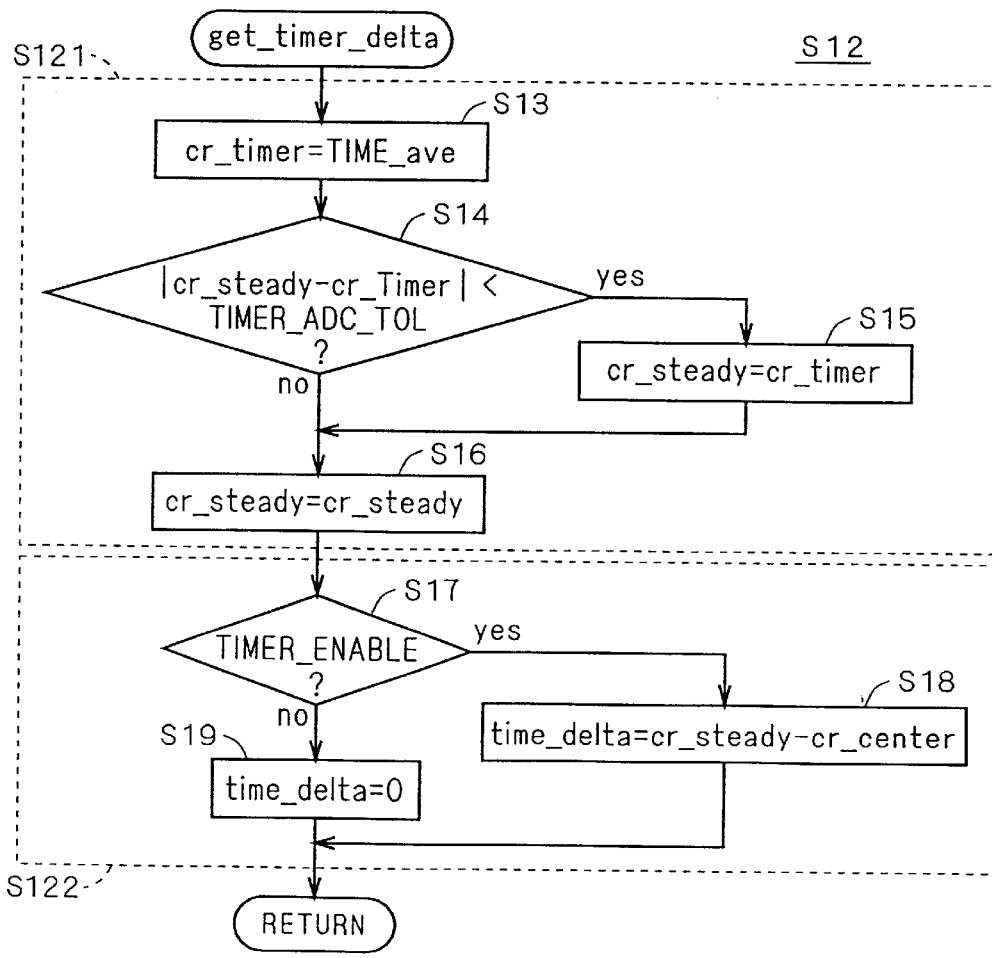

FIG. 8 shows the get_timer_delta subroutine S12. The subroutine S12 includes a step S121 for calculating a deterioration value cr_steady at the present time and a step S122 for calculating a saturation arrival time time_delta.

First of all, the step S121 will be described below. The CPU 15 fetches and stores a deterioration value TDS at the present time t4. For example, an average value TIME_ave of the deterioration values TDS at the latest four times (t4, t3, t2 and t1) is calculated and is substituted for a deterioration value cr_Timer.

The deterioration in the alignment is slowly changed in three hours, for example. Therefore, if the repetition cycle of the main routine is greatly reduced to decrease a time difference between the last time t3 and the present time t4, a difference between the deterioration value cr_Timer (deterioration value cr_steady) at the last time t3 and the deterioration value cr_Timer at the present time t4 almost approximates to zero. However, if an error of the A/D converter 14 (FIG. 5) is increased, the difference between the deterioration value cr_steady and the deterioration value cr_Timer is increased. It is decided whether an absolute value of the difference between the deterioration value cr_steady and the deterioration value cr_Timer is kept within an allowable value TIMER_ADC_TOL or not (step S14). If the absolute value is kept within the allowable value TIMER_ADC_TOL (yes), it is assumed that the deterioration value cr_Timer at the present time t4 is normal, thereby updating the deterioration value cr_steady to the deterioration value cr_Timer at the present time t4 (step S15). If not so (no), it is assumed that the deterioration value cr_Timer at the present time t4 is abnormal, thereby setting the deterioration value cr_Timer at the last time t3 as the deterioration value cr_Timer at the present time t4. The deterioration value cr_Timer which has passed through the step S14 or the step S15 is defined as a value at the present time t4 (step S16).

As described above, the average value TIME_ave of the deterioration values TDS at the latest four times is calculated and the absolute value of the difference between the deterioration value cr_steady and the deterioration value cr_Timer is compared with the allowable value TIMER_ADC_TOL to calculate the deterioration value cr_steady by filtering the deterioration value TDS at the present time. Consequently, even if the error of the A/D converter 14 is great, the image correcting device can stably operate.

Next, the step S122 will be described below. At a TIMER_ENABLE step S17, the deterioration value cr_steady is compared with the expected value cr_center. If the deterioration value cr_steady is greater than the expected value cr_center (yes), it is decided that a saturation state is not set. If not so (no), it is decided that the saturation state is set. If the saturation state is set (no), zero is substituted for the saturation arrival time time_delta (step S19). On the other hand, if not so, a value obtained by subtracting the expected value cr_center from the deterioration value cr_steady is substituted for the saturation arrival time time_delta (step S18). As described above, the saturation arrival time time_delta is calculated.

Figure 9:
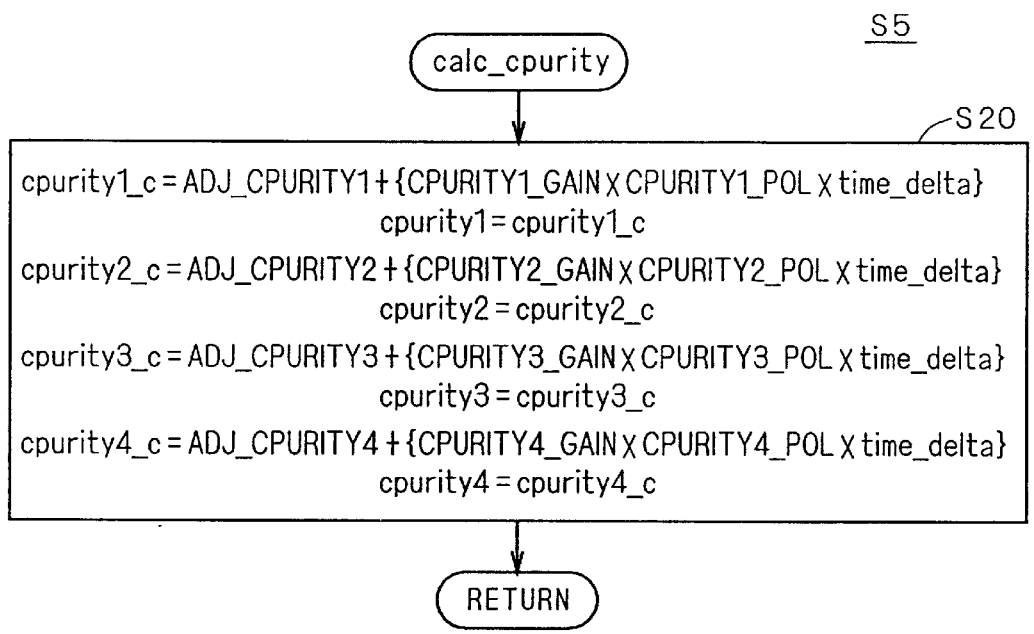

FIG. 9 shows the calc_cpurity subroutine S5. The calc_cpurity subroutine S5 includes a step S20 for calculating current values cpurity1, cpurity2, cpurity3 and cpurity4. When the calc_cpurity subroutine S5 starts, a step S20 is executed. At the step S20, the current values cpurity1, cpurity2, cpurity3 and cpurity4 which range from 0 to 255 are calculated by Equations 1 to 4, for example. When the step S20 ends, the process returns to the main routine.

$$\text{cpurity1} = \text{ADJ\_CPURITY1} + \{\text{CPURITY1\_GAIN} \times \text{CPURITY1\_POL} \times \text{time\_delta}\} \quad \text{(Equation 1)}$$

$$\text{cpurity2} = \text{ADJ\_CPURITY2} + \{\text{CPURITY2\_GAIN} \times \text{CPURITY2\_POL} \times \text{time\_delta}\} \quad \text{(Equation 2)}$$

$$\text{cpurity3} = \text{ADJ\_CPURITY3} + \{\text{CPURITY3\_GAIN} \times \text{CPURITY3\_POL} \times \text{time\_delta}\} \quad \text{(Equation 3)}$$

$$\text{cpurity4} = \text{ADJ\_CPURITY4} + \{\text{CPURITY4\_GAIN} \times \text{CPURITY4\_POL} \times \text{time\_delta}\} \quad \text{(Equation 4)}$$

In the Equations 1 to 4, ADJ_CPURITY1, ADJ_CPURITY2, ADJ_CPURITY3 and ADJ_CPURITY4 are offset values of the current values cpurity1, cpurity2, cpurity3 and cpurity4, respectively. Each of CPURITY1_GAIN, CPURITY2_GAIN, CPURITY3_GAIN and CPURITY4_GAIN denotes a rate (gain) of a change in each of the current values cpurity1, cpurity2, cpurity3 and cpurity4 for the deterioration value TDS. CPURITY1_POL, CPURITY2_POL, CPURITY3_POL and CPURITY4_POL are polarity values (−1 or +1) of the gains CPURITY1_GAIN, CPURITY2_GAIN, CPURITY3_GAIN and CPURITY4_GAIN, respectively.

Figure 10:
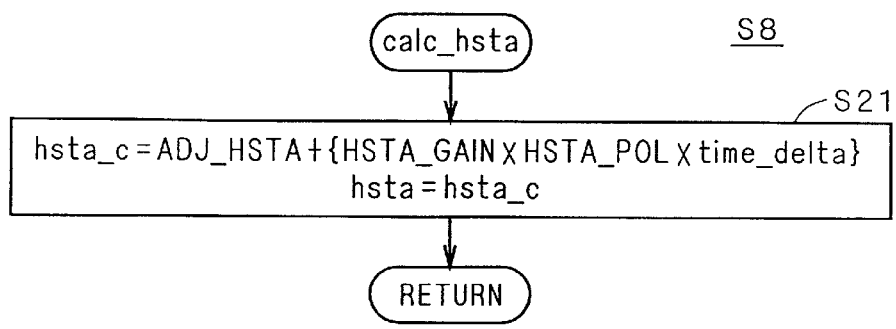

FIG. 10 shows the calc_hsta subroutine S8. The calc_hsta subroutine S8 includes a step S21 for calculating a current value hsta. When the calc_hsta subroutine S8 starts, the step S21 is executed. At the step S21, a current value hsta ranging from 0 to 255 is calculated by Equation 5, for example. When the step S21 ends, the process returns to the main routine.

$$\text{hsta} = \text{ADJ\_HSTA} + \{\text{HSTA\_GAIN} \times \text{HSTA\_POL} \times \text{time\_delta}\} \quad \text{(Equation 5)}$$

In the Equation 5, ADJ_HSTA is an offset value of the current value hsta. The HSTA_GAIN denotes a rate (gain) of a change in the current value hsta for the deterioration value TDS. HSTA_POL denotes a polarity value (−1 or +1) of the gain HSTA_GAIN.

Figure 11:
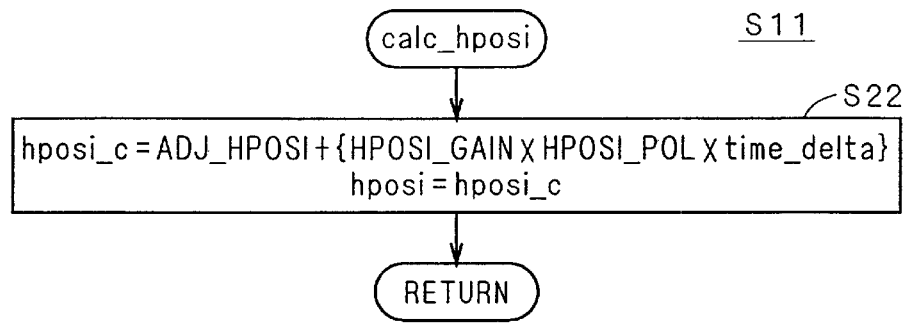

FIG. 11 shows the calc_hposi subroutine S11. The calc_hposi subroutine S11 includes a step S22 for calculating a current value hposi. When the calc_hposi subroutine S11 starts, the step S22 is executed. At the step S22, a current value hposi ranging from 0 to 255 is calculated by Equation 6, for example. When the step S22 ends, the process returns to the main routine.

$$\text{hposi} = \text{ADJ\_HPOSI} + \{\text{HPOSI\_GAIN} \times \text{HPOSI\_POL} \times \text{time\_delta}\} \quad \text{(Equation 6)}$$

In the Equation 6, ADJ_HPOSI is an offset value of the current value hposi. HPOSI_GAIN denotes a rate (gain) of a change in the current value hposi for the deterioration value TDS. HPOSI_POL denotes a polarity value (−1 or +1) of the gain HPOSI_GAIN.

The offset value, the gain and the polarity value which have been described above are properly obtained by a simulation, for example, and are set before a cathode ray tube display unit is offered to the market. The offset value can easily be changed by a user with an adjusting knob (not shown) provided in the cathode ray tube display unit. Consequently, the user side can finely adjust the landing, the convergence and the horizontal image position optionally. By properly presetting the gain and the polarity value on the provider side, the landing, the convergence and the horizontal image position can be corrected optimally and automatically at each optional time after the power ON.

As described above with reference to FIGS. 4 to 11, the correction current is decreased, thereby further reducing the power consumption required for correcting the image as the time fully passes after the power ON.

Moreover, the microcomputer 2 receives the deterioration value TDS indicative of the degree of the deterioration in the alignment of the cathode ray tube 24 in a real time, and calculates an optimum current value of the correction current with a computer program. Consequently, the landing, the convergence and the horizontal image position can automatically be corrected well all the time after the power ON.

By the characteristics of the cathode ray tube 24, besides, the rate of an increase in the deterioration is more reduced as the time passes after the cathode ray tube 24 is turned on. Correspondingly, the rate of a decrease in the correction currents output from the drivers 4 to 7 and 22 is more reduced as the time passes. Consequently, the deterioration in the alignment can properly be corrected.

Next, parameters required for the landing correcting step CPS, the convergence correcting step HSS and the horizontal image position correcting step HPS will be described more specifically. In the following description, the cathode ray tube 24 is to be used for a computer.

First of all, the parameter required for the landing correcting step CPS includes polarity values CPURITY1_POL, CPURITY2_POL, CPURITY3_POL and CPURITY4_POL, gains CPURITY1_GAIN, CPURITY2_GAIN, CPURITY3_GAIN and CPURITY4_GAIN, and non-correction values cpurity1_fact, cpurity2_fact, cpurity3_fact and cpurity4_fact.

Figure 13:
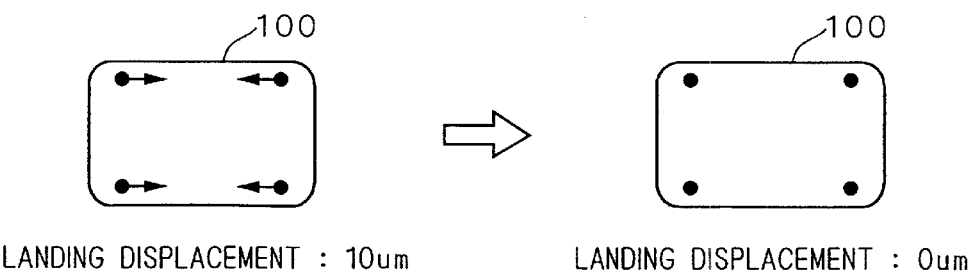

Specifically, there will be considered the case where the cathode ray tube 24 is changed as the time passes as shown in FIG. 13. Immediately after the power ON, upper and lower left portions of an image displayed on the display surface 100 are positioned on the right of desired positions, upper and lower right portions of the image displayed on the display surface 100 are positioned on the left of desired positions, and a displacement from each of the desired positions is 10 $\mu$m. When the time fully passes after the power ON, four corners of the image on the display surface 100 are positioned as desired (that is, the displacement is 0 $\mu$m).

Figure 12:
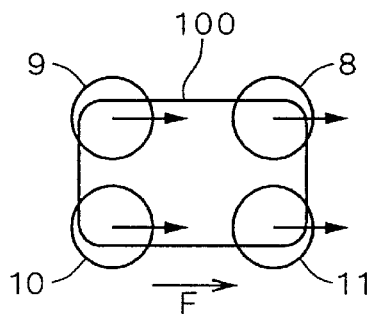
FIGS. 12 to 23 are diagrams illustrating operation of the image correcting device according to the embodiment of the present invention.

In the above-mentioned specific case, an example in which a just state is always kept after the power ON will be taken. In respect of a hardware, first of all, the first to fourth landing correcting coils 8 to 11 are fixed to the four corners of the cathode ray tube 24 in such a manner that four corners of the image are moved in a direction of an arrow F when a correction current flows to each of the first to fourth landing correcting coils 8 to 11 in a forward direction as shown in FIGS. 12 and 4. A circuit is designed in such a manner that the values of the correction currents output from the drivers 3 to 6 are changed by ±1.0 mA when the current values cpurity1, cpurity2, cpurity3 and cpurity4 input to the D/A converters 16 to 19 (FIG. 5) are changed by ±1. It is assumed that the four corners of the image on the display surface 100 are moved by |1.0 μm| when the current values cpurity1, cpurity2, cpurity3 and cpurity4 are changed by ±1 as a result of a measurement for the manufactured cathode ray tube display unit. Furthermore, it is assumed that the deterioration value TDS is set as shown in FIG. 21. In this case, the following setting is preferable.

CPURITY1_POL=+1

CPURITY2_POL=−1

CPURITY3_POL=−1

CPURITY4_POL=+1

CPURITY1_GAIN=10/140

CPURITY2_GAIN=10/140

CPURITY3_GAIN=10/140

CPURITY4_GAIN=10/140.

Figure 14:
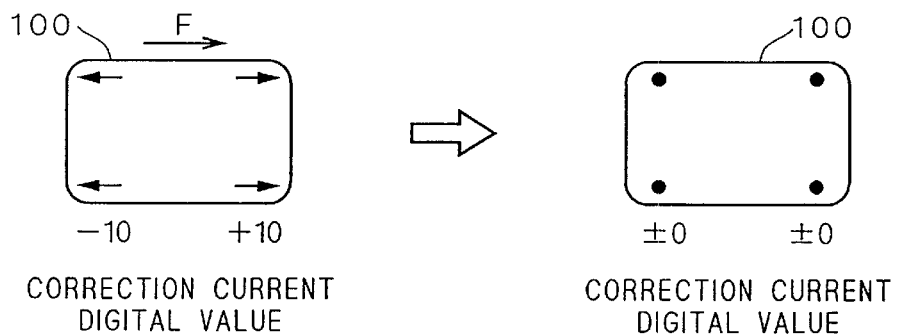

Although the polarity values CPURITY1_POL, CPURITY2_POL, CPURITY3_POL and CPURITY4_POL denote the polarities of the gains CPURITY1_GAIN, CPURITY2_GAIN, CPURITY3_GAIN and CPURITY4_GAIN as described above, it also denotes a direction in which the four corners of the image on the display surface 100 are moved. As shown in FIG. 12, the direction F from the left to the right is defined as plus (+1) and a direction reverse to the direction F is defined as minus (−1). As shown in FIG. 14, upper and lower right portions of the image on the display surface 100 are moved in the direction F and the upper and lower left portions of the image on the display surface 100 are moved in the direction reverse to the direction F. Therefore, the polarity values CPURITY1_POL and CPURITY4_POL are set to +1 and the polarity values CPURITY2_POL and CPURITY3_POL are set to −1. As shown in FIG. 21, moreover, the deterioration value TDS fluctuates by 140(=240−100) while the deterioration in the landing is completely recovered and is then saturated. In the meantime, it is necessary to move the four corners of the image on the display surface 100 by |10 μm|. In order to move the four corners of the image on the display surface 100 by |10 μm|, it is necessary to change the value of the correction current by 10 mA based on the result of the measurement. In order to change the value of the correction current by 10 mA, it is necessary to change the current values cpurity1, cpurity2, cpurity3 and cpurity4 by 10, respectively. As described above, the gains CPURITY1_GAIN, CPURITY2_GAIN, CPURITY3_GAIN and CPURITY4_GAIN are set to 10/140, respectively.

In the case shown in FIG. 21, for example, the saturation arrival time time_delta=140 is set immediately after the power ON. Therefore, respective values are substituted for the Equations 1 to 4.

$$cpurity1 = \text{ADJ\_CPURITY1} + \{(10/140) \times (+1) \times 140\}$$
$$= \text{ADJ\_CPURITY1} + 10$$
$$cpurity2 = \text{ADJ\_CPURITY2} + \{(10/140) \times (-1) \times 140\}$$
$$= \text{ADJ\_CPURITY2} - 10$$
$$cpurity3 = \text{ADJ\_CPURITY3} + \{(10/140) \times (-1) \times 140\}$$
$$= \text{ADJ\_CPURITY3} - 10$$
$$cpurity4 = \text{ADJ\_CPURITY4} + \{(10/140) \times (+1) \times 140\}$$
$$= \text{ADJ\_CPURITY4} + 10$$

As the time passes, the saturation arrival time time_delta further approximates to zero as follows.

$$cpurity1 = \text{ADJ\_CPURITY1} + \{(10/140) \times (+1) \times 0\}$$
$$= \text{ADJ\_CPURITY1}$$
$$cpurity2 = \text{ADJ\_CPURITY2} + \{(10/140) \times (-1) \times 0\}$$
$$= \text{ADJ\_CPURITY2}$$
$$cpurity3 = \text{ADJ\_CPURITY3} + \{(10/140) \times (-1) \times 0\}$$
$$= \text{ADJ\_CPURITY3}$$
$$cpurity4 = \text{ADJ\_CPURITY4} + \{(10/140) \times (+1) \times 0\}$$
$$= \text{ADJ\_CPURITY4}$$

If the saturation state is set, the step S4 is executed in place of the calc_cpurity subroutine S5 (FIG. 6).

cpurity1=cpurity1_fact cpurity2=cpurity2_fact cpurity3=cpurity3_fact cpurity4=cpurity4_fact A parameter required for the convergence correcting step HSS includes a polarity value HSTA_POL, a gain HSTA_GALN and a non-correction value hsta_fact.

Figure 16:
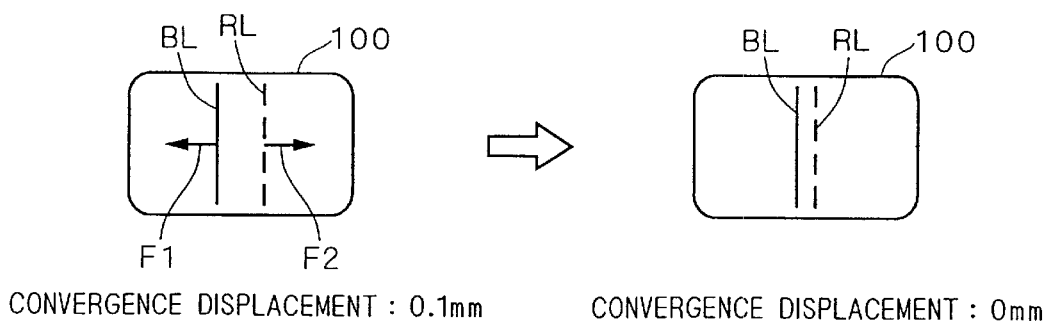

Specifically, there will be considered the case where the cathode ray tube 24 is changed with the passage of the time as shown in FIG. 16. Immediately after the power ON, a red line RL of an image displayed on the display surface 100 is positioned on the right of a desired position, a blue line BL of the image displayed on the display surface 100 is positioned on the left of a desired position, and a displacement from each of the desired positions is 0.1 mm. When the time fully passes after the power ON, the red and blue lines RL and BL on the display surface 100 are positioned as desired (that is, the displacement is 0 mm).

Figure 15:
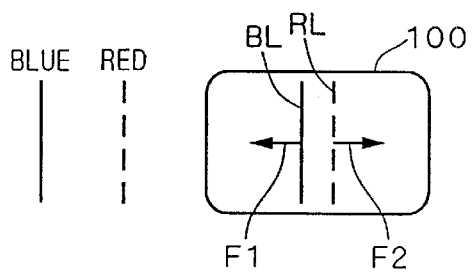

In the above-mentioned specific case, an example in which a just state is always kept after the power ON will be taken. In respect of a hardware, first of all, the convergence correcting coil 12 is fixed to the cathode ray tube 24 in such a manner that the blue line BL is moved from the right to the left (in a direction F1) and the red line RL is moved from the left to the right (in a direction F2) when a correction current flows to the convergence correcting coil 12 in a forward direction as shown in FIGS. 15 and 4. A circuit is designed in such a manner that the value of the correction current output from the driver 7 is changed by ±1.0 mA when the current value hsta input to the D/A converter 20 (FIG. 5) is changed by ±1. It is assumed that the red line RL and the blue line BL are moved by an absolute value of |0.01 mm| when the current value hsta is changed by ±1 as a result of a measurement for the manufactured cathode ray tube display unit. Furthermore, it is assumed that the deterioration value TDS is set as shown in FIG. 21. In this case, the following setting is preferred.

HSTA_POL=−1

HSTA_GAIN=10/140

Figure 17:
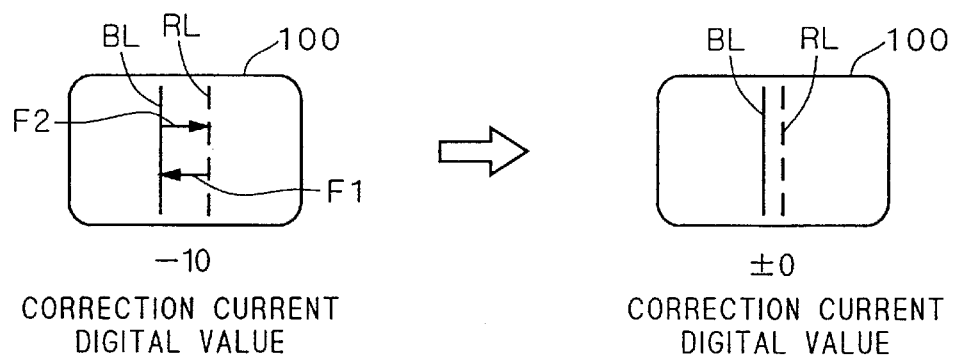

Although the polarity value HSTA_POL denotes the polarity of the gain HSTA_GAIN as described above, it also denotes directions in which the red line RL and the blue line BL are moved. As shown in FIG. 15, the direction F2 for the red line RL is defined as plus (+1) and the direction F1 reverse to the direction F2 is defined as minus (−1). On the other hand, the direction F1 for the blue line BL is defined as plus (+1) and the direction F2 is defined as minus (−1). As shown in FIG. 17, the red line RL on the display surface 100 is moved in the direction F1 and the blue line BL is moved in the direction F2. Therefore, the polarity value HSTA_POL is set to −1. As shown in FIG. 21, moreover, the deterioration value TDS fluctuates by 140(=240−100) while the deterioration in the convergence is completely recovered and is then saturated. In the meantime, it is necessary to move the red and blue lines RL and BL on the display surface 100 by |0.1 mm|. In order to move the red and blue lines RL and BL on the display surface 100 by |0.1 mm|, it is necessary to change the value of the correction current by 10 mA based on the result of the measurement described above. In order to change the value of the correction current by 10 mA, it is necessary to change the current value hsta by 10. As described above, the gain HSTA_GAIN is set to 10/140.

In the case shown in FIG. 21, for example, the saturation arrival time time_delta=140 is set immediately after the power ON. Therefore, respective values are substituted for the Equation 5.

$$hsta = \text{ADJ\_HSTA} + \{(10/140) \times (-1) \times 140\}$$
$$= \text{ADJ\_HSTA} - 10$$

As the time passes, the saturation arrival time time_delta further approximates to zero as follows.

$$hsta = \text{ADJ\_HSTA} + \{(10/140) \times (-1) \times 0\}$$
$$= \text{ADJ\_HSTA}$$

If the saturation state is set, the step S7 is executed in place of the calc_hsta subroutine S8 (FIG. 6).

hsta=hsta_fact

A parameter required for the horizontal image position correcting step HPS includes a polarity value HPOSI_POL, a gain HPOSI_GAIN and a non-correction value hposi_fact.

Figure 19:
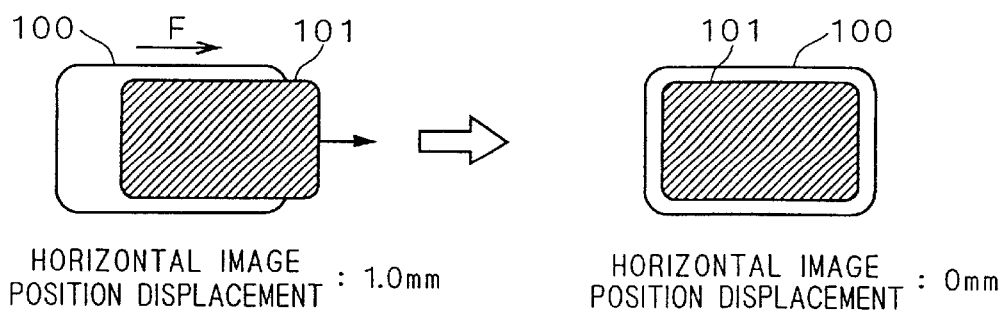

Specifically, there will be considered the case where the cathode ray tube 24 is changed with the passage of the time as shown in FIG. 19. Immediately after the power ON, an image 101 displayed on the display surface 100 is positioned on the right of a desired position and a displacement from the desired position is 1.0 mm. When the time fully passes after the power ON, the image 101 on the display surface 100 is positioned as desired (that is, the displacement is 0 mm).

Figure 18:
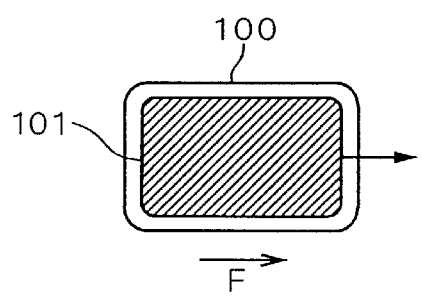

In the above-mentioned specific case, an example in which a just state is always kept after the power ON will be taken. In respect of a hardware, first of all, the deflecting yoke 23 is fixed to the cathode ray tube 24 in such a manner that the image 101 is moved in the direction of an arrow F when a correction current flows to the deflecting yoke 23 in a forward direction as shown in FIGS. 18 and 4. A circuit is designed in such a manner that a value of a correction current output from the driver 22 is changed by ±1.0 mA when the current value hposi input to the D/A converter 21 (FIG. 5) is changed by ±1. It is assumed that the image on the display surface 100 is moved by an absolute value of |0.01 mm| when the current value hposi is changed by ±1 as a result of a measurement for the manufactured cathode ray tube display unit. Furthermore, it is assumed that the deterioration value TDS is set as shown in FIG. 21. In this case, the following setting is preferred.

HPOSI_POL=−1
HPOSI_GAIN=10/140

Figure 20:
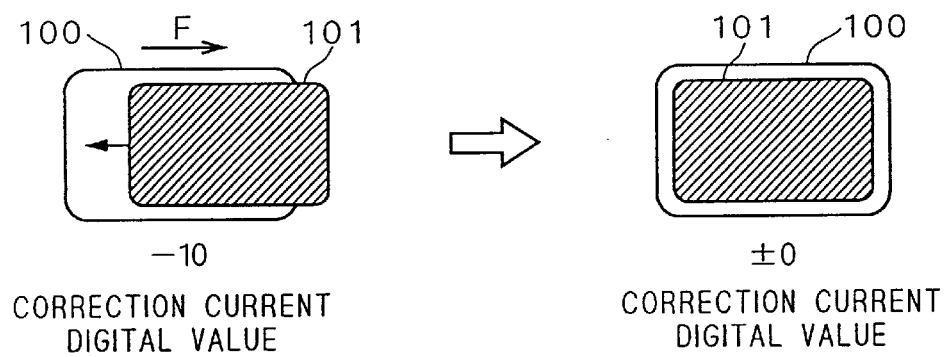

Although the polarity value HPOSI_POL denotes the polarity of the gain HPOSI_GAIN as described above, it also denotes a direction in which the image 101 on the display surface 100 is moved. As shown in FIG. 18, the direction F is defined as plus (+1) and a direction reverse to the direction F is defined as minus (−1). As shown in FIG. 20, the image 101 on the display surface 100 is moved in the direction reverse to the direction F. Therefore, the polarity value HPOSI_POL is set to −1. As shown in FIG. 21, moreover, the deterioration value TDS fluctuates by 140(=240−100) while the deterioration in the horizontal image position is completely recovered and is then saturated. In the meantime, it is necessary to change the image 101 on the display surface 100 by |0.1 mm|. In order to change the image 101 on the display surface 100 by |0.1 mm|, it is necessary to change the value of the correction current by 10 mA based on the result of the measurement. In order to change the value of the correction current by 10 mA, it is necessary to change the current value hposi by 10. As described above, the gain HPOSI_GAIN is set to 10/140.

In the case shown in FIG. 21, for example, the saturation arrival time time_delta=140 is set immediately after the power ON. Therefore, respective values are substituted for the Equation 6.

$$hposi = \text{ADJ\_HPOSI} + \{(10/140) \times (-1) \times 140\}$$
$$= \text{ADJ\_HPOSI} - 10$$

As the time passes, the saturation arrival time time_delta further approximates to zero as follows.

$$hposi\_c = \text{ADJ\_HPOSI} + \{(10/140) \times (-1) \times 0\}$$
$$= \text{ADJ\_HPOSI}$$

If the saturation state is set, the step S10 is executed in place of the calc_hposi subroutine S11 (FIG. 6).

hposi=hposi_fact

In the above-mentioned specific example, there has been considered the case where the just state can be set even if the correction current does not flow when the time fully passes after the power ON. Therefore, all the non-correction values are set to zero. Consequently, the correction current further approximates to zero as the time passes after the power ON. In the saturation state, the power consumption required for correcting the image can be set to zero and the just state can be kept.

As described above, all the gains, the polarity values, the non-correction values, the offset values, the expected values and the like which are obtained before a product is offered to the market are stored as the data MD in the memory 13. Accordingly, the contents of the memory 13 can be rewritten or the memory 13 can be replaced, thereby easily changing these values.

At an inspecting step in the process for manufacturing the cathode ray tube 24, even if some of a plurality of mass-produced cathode ray tubes 24 which have shifted characteristics of the deterioration in the alignment are detected, a special memory 13 prepared by measuring an aging for the cathode ray tubes 24 can absorb the shift of the characteristics of the deterioration in the alignment. Consequently, the same results of image display can be obtained for any of the cathode ray tubes 24.

Variant

While the case where the gains CPURITY1_GAIN, CPURITY2_GAIN, CPURITY3_GAIN and CPURITY4_GAIN in the Equations 1 to 4 are equal to each other has been described in the above-mentioned embodiment, they can be changed for each of the Equations 1 to 4. Consequently, the present invention can also cope with the case where the landing is not similarly changed on the four corners of the display surface 100 of the cathode ray tube 24. While there has been described the case where the polarity values CPURITY1_POL, CPURITY2_POL, CPURITY3_POL, CPURITY4_POL, HSTA_POL, and HPOSI_POL have two kinds of values, that is, (+1) and (−1), setting may be performed on a software basis (for example, the change of the Equations 1 to 4) or on a hardware basis (for example, the change of the first to fourth landing correcting coils 8 to 11) in such a manner that all the polarity values are set to (+1), for example.

Figure 22:
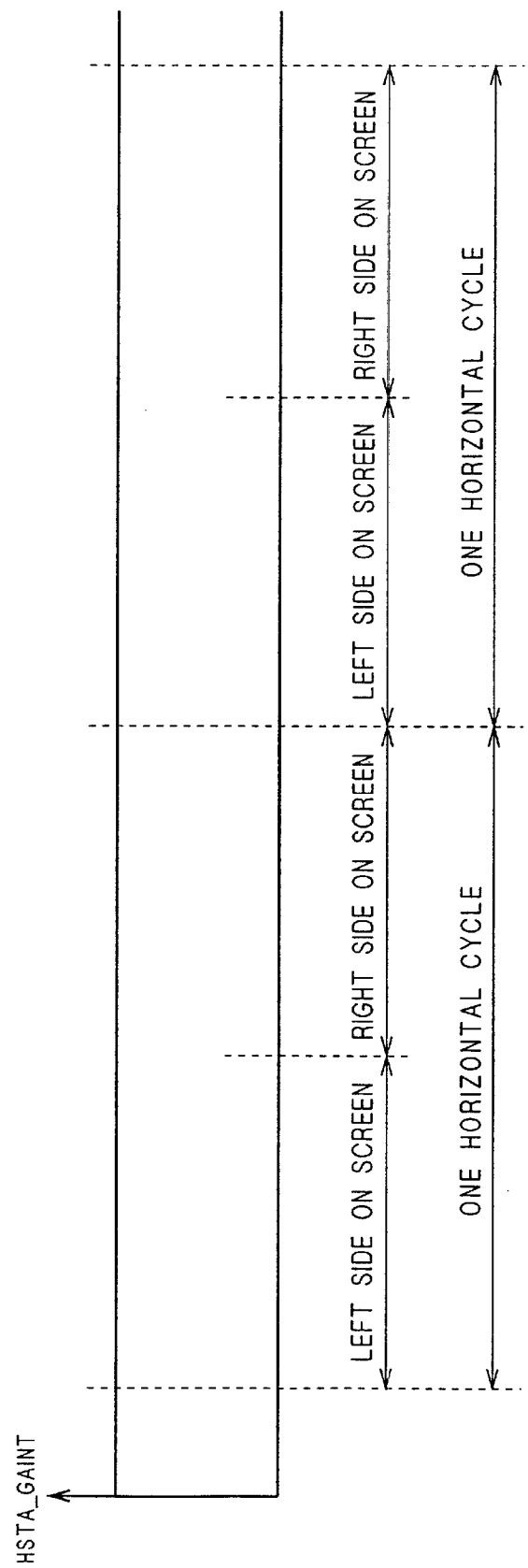
Figure 23:
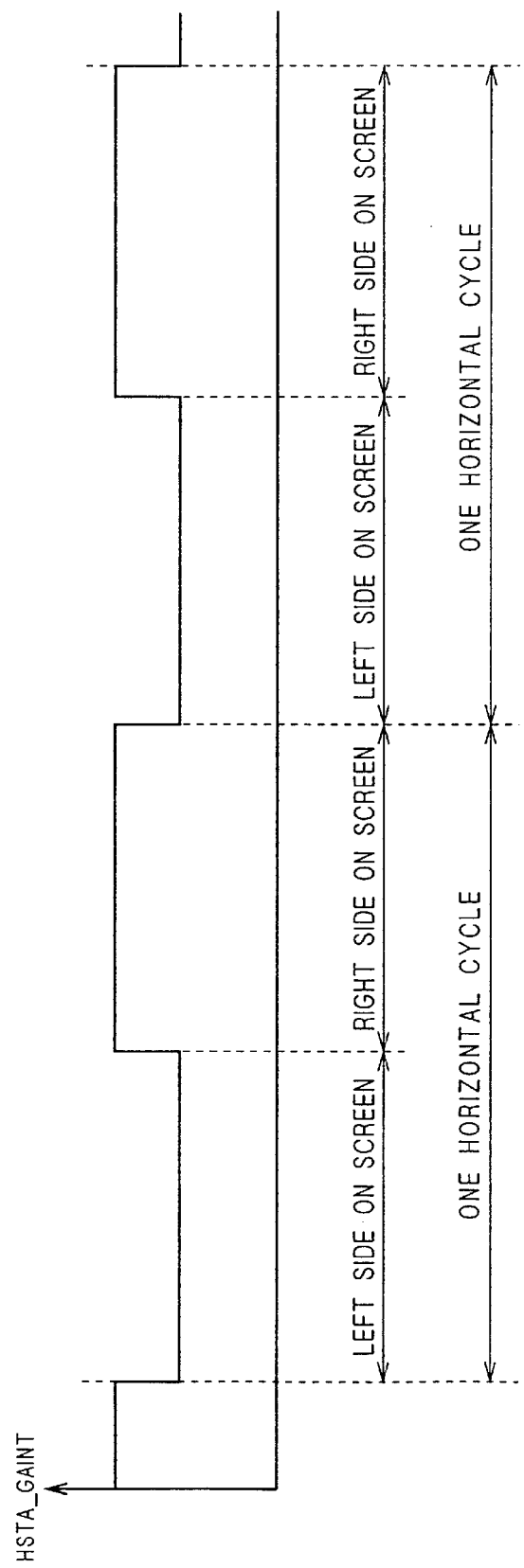
Figure 24:
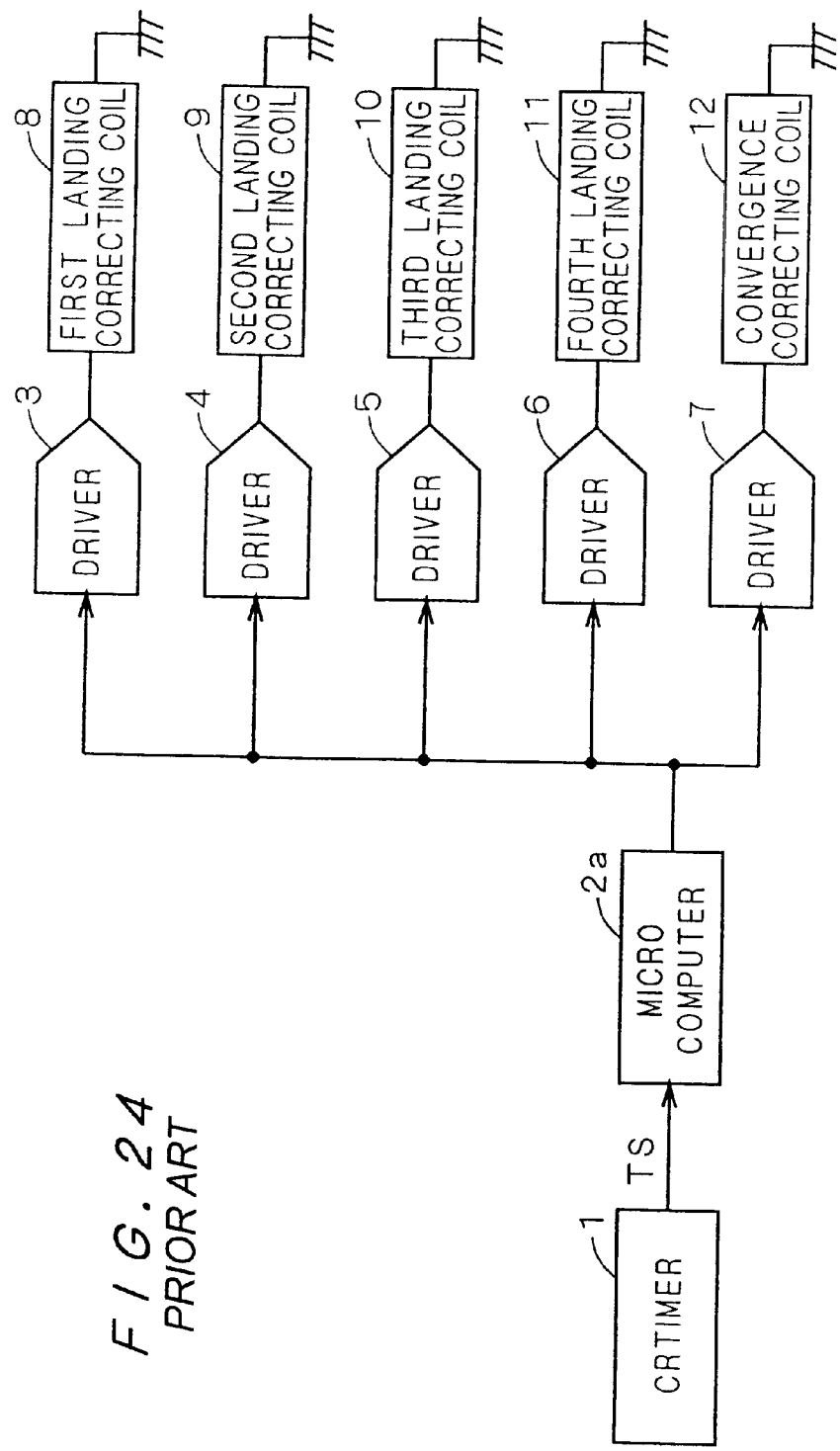
FIG. 24 is a block diagram showing an image correcting device according to the prior art.

While it has been assumed that the gain HSTA_GAIN is identical over the whole area of the display surface 100 of the cathode ray tube 24 as shown in FIG. 22, the current value hsta may be set in such a manner that it is varied on the left and right sides of the display surface 100 for one horizontal period synchronously with a horizontal deflecting signal HSYNC of the image displayed by the cathode ray tube 24 as shown in FIG. 23. Consequently, the present invention can also cope with the case where the convergence is not similarly changed on the left and right sides of the display surface 100 of the cathode ray tube 24.

Although there has been described the case where the correcting device C includes all the first to fourth landing correcting coils 8 to 11, the convergence correcting coil 12 and the deflecting yoke 23, it is sufficient that the correcting device C includes at least one of the first to fourth landing correcting coils 8 to 11, the convergence correcting coil 12 and the defecting yoke 23.

While yes and no have been selected by comparing the deterioration value cr_steady with the expected value cr_center at the CPURITY_ENABLE step S3, the HSTA_ENABLE step S6 and the HPOSI_ENABLE step S9 shown in FIG. 6 and the TIMER_ENABLE step S17 shown in FIG. 8, the yes and no may be selected by other methods at the CPURITY_ENABLE step S3, the HSTA_ENABLE step S6, the HPOSI_ENABLE step S9 and the TIMER_ENABLE step S17 and, for example, a user may select the yes and no.

Furthermore, it is preferable that the correction current should be further decreased monotonously, that is, should be further decreased without an increase as the time passes. Therefore, the current value may include the same period.

While the invention has been described in detail, the foregoing description is in all aspects illustrative and not restrictive. It is understood that numerous other modifications and variations can be devised without departing from the scope of the invention.

What is claimed is:

1. A method for automatically correcting an image displayed on a cathode ray tube by supplying a correction current to the cathode ray tube, comprising the step of: monotonously decreasing the correction current as a time passes after the cathode ray tube is turned on.

2. The image correcting method according to claim 1, further comprising the step of reducing a rate of the decrease in the correction current more as a time passes after the cathode ray tube is turned on.

3. The image correcting method according to claim 1, further comprising the step of causing the correction current to approximate to zero after the cathode ray tube is turned on.

4. The image correcting method according to claim 1, wherein an object for automatically correcting the image includes at least one of landing, convergence and a horizontal image position.

5. An image correcting device for automatically correcting an image displayed on a cathode ray tube by supplying a correction current to the cathode ray tube, comprising:

a calculating circuit for calculating a value of the correction current in such a manner that the correction current is decreased monotonously as a time passes after the cathode ray tube is turned on;

a driver for generating and outputting the correction current in accordance with a result of the calculation obtained by the calculating circuit; and a correcting device provided in the cathode ray tube for correcting the image displayed on the cathode ray tube on receipt of the correction current from the driver.

6. The image correcting device according to claim 5, wherein the calculating circuit calculates the value of the correction current in such a manner that a rate of the decrease in the correction current is more reduced as a time passes after the cathode ray tube is turned on.

7. The image correcting device according to claim 5, wherein the calculating circuit calculates the value of the correction current in such a manner that the correction current is caused to approximate to zero after the cathode ray tube is turned on.

8. The image correcting device according to claim 5, wherein the correcting device includes at least one of a coil for correcting landing, a coil for correcting convergence and a yoke for correcting a horizontal image position.

9. The image correcting device according to claim 5, further comprising an external terminal for giving data necessary for the calculating circuit to calculate the value of the correction current from an outside.

10. A cathode ray tube display unit comprising:

the image correcting device according to claim 5; and the cathode ray tube.

11. A method for correcting the position of an image displayed on a cathode ray tube, comprising the steps of:

positioning an image at an initial position from a desired position based on the determined maximum displacement of an image caused by the operation of the cathode ray tube;

applying a correction current to correct from the displacement; and decreasing the correction current over a period of time beginning from the time the cathode ray tube is turned on.

* * * * *